US005265425A

United States Patent [19]

Howell

[11] Patent Number: 5,265,425
[45] Date of Patent: Nov. 30, 1993

[54] AERO-SLINGER COMBUSTOR

[75] Inventor: Stephen J. Howell, Georgetown, Mass.

[73] Assignee: General Electric Company, Cincinnati, Ohio

[21] Appl. No.: 59,342

[22] Filed: May 11, 1993

Related U.S. Application Data

[63] Continuation of Ser. No. 764,290, Sep. 23, 1991, abandoned.

[51] Int. Cl.$^5$ .............................. F02C 3/14; F02C 7/22
[52] U.S. Cl. ........................................ 60/736; 60/743; 60/756
[58] Field of Search ............... 60/39.36, 740, 743, 60/749, 756, 757

[56] References Cited

U.S. PATENT DOCUMENTS

| 3,820,324 | 6/1974 | Grindley et al. | 60/756 |
|---|---|---|---|
| 4,070,826 | 1/1978 | Stenger et al. | 60/39.66 |
| 4,085,580 | 4/1978 | Slattery | 60/756 |
| 4,351,156 | 9/1982 | White et al. | 60/737 |
| 4,437,314 | 3/1984 | Collin | 60/738 |
| 4,761,959 | 8/1988 | Romey et al. | 60/740 |
| 4,891,936 | 1/1990 | Shekleton et al. | 60/39.36 |
| 4,893,754 | 1/1990 | Ruiz | 239/601 |
| 4,928,479 | 5/1990 | Shekleton et al. | 60/39.36 |
| 4,936,090 | 6/1990 | Shekleton | 60/39.141 |
| 4,955,201 | 9/1990 | Shekleton et al. | 60/738 |
| 4,967,562 | 11/1990 | Shekleton | 60/39.36 |
| 4,967,563 | 11/1990 | Shekleton | 60/743 |

FOREIGN PATENT DOCUMENTS

| 0433868A1 | 12/1990 | European Pat. Off. . |
| 1510755 | 1/1968 | France . |
| 2203023 | 1/1972 | France . |
| 2312654 | 5/1975 | France . |
| 2626043 | 9/1988 | France . |
| 2098719 | 5/1981 | United Kingdom . |

Primary Examiner—Louis J. Casaregola
Attorney, Agent, or Firm—Jerome C. Squillaro; Nathan D. Herkamp

[57] ABSTRACT

A combustor includes radially spaced apart outer and inner liners joined together at upstream ends through an annular dome disposed coaxially about a longitudinal centerline axis. A plurality of circumferentially spaced apart fuel injectors are disposed adjacent to an arcuate a splashplate for injecting fuel thereagainst, the splashplate being arcuate about the centerline axis. Primary air is channeled along the splashplate for mixing with the injected fuel for forming a fuel/air mixture dischargeable from the splashplate into a combustion zone defined between the liners and the dome.

15 Claims, 6 Drawing Sheets

AERO-SLINGER COMBUSTOR

This application is a continuation of application Ser. No. 07/764,290, filed Sep. 23, 1991 (abandoned).

TECHNICAL FIELD

The present invention relates generally to gas turbine engines, and, more specifically, to a combustor therefor.

BACKGROUND ART

Gas turbine engines used for powering aircraft, for example, include a compressor for compressing ambient air for providing compressed air to a combustor disposed axially downstream therefrom. Fuel is mixed with the compressed air in the combustor and ignited for generating combustion gases which are discharged therefrom axially downstream to a high pressure turbine which powers the compressor.

The fuel is mixed with the compressed air in the combustor typically in a plurality of circumferentially spaced apart carburetors each including a fuel injector and an air swirler. The carburetors are typically disposed in the dome of the combustor radially between the outer and inner combustion liners thereof. Since a plurality of circumferentially spaced carburetors are utilized, the resulting fuel/air mixtures discharged therefrom inherently provide a circumferentially varying profile with a corresponding circumferentially varying temperature distribution in the combustion gases generated therefrom.

A pattern factor is a conventionally known parameter which indicates the amount of circumferential variation of the combustion gas temperature around the combustor outlet and has a value ranging between about 0.25-0.30 for high performance combustors. Improvements in the pattern factor are being considered with levels reduced to about 0.15 which is a substantially low value requiring improved circumferential uniformity of the fuel/air mixture being discharged from the carburetors of the combustor.

The shorter a combustor is made in the axial direction for reducing weight and cooling-air requirements thereof, the greater is the difficulty in achieving reduced pattern factor.

OBJECTS OF THE INVENTION

Accordingly, one object of the present invention is to provide a new and improved gas turbine engine combustor.

Another object of the present invention is to provide a combustor having improved circumferential uniformity of a fuel/air mixture for reducing pattern factor, and to do so with fewer fuel injection points.

Another object of the present invention is to provide a more compact and axially shorter combustor and combustor casing, for providing a more compact and lower weight engine.

DISCLOSURE OF INVENTION

A combustor includes radially spaced apart outer and inner liners joined together at upstream ends through an annular dome disposed coaxially about a longitudinal centerline axis. A plurality of circumferentially spaced apart fuel injectors are disposed adjacent to a splashplate for injecting fuel thereagainst, the splashplate being arcuate about the centerline axis. Primary air is channeled along the splashplate for mixing with the injected fuel for forming a fuel/air mixture dischargeable from the splashplate into a combustion zone defined between the liners and the dome.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
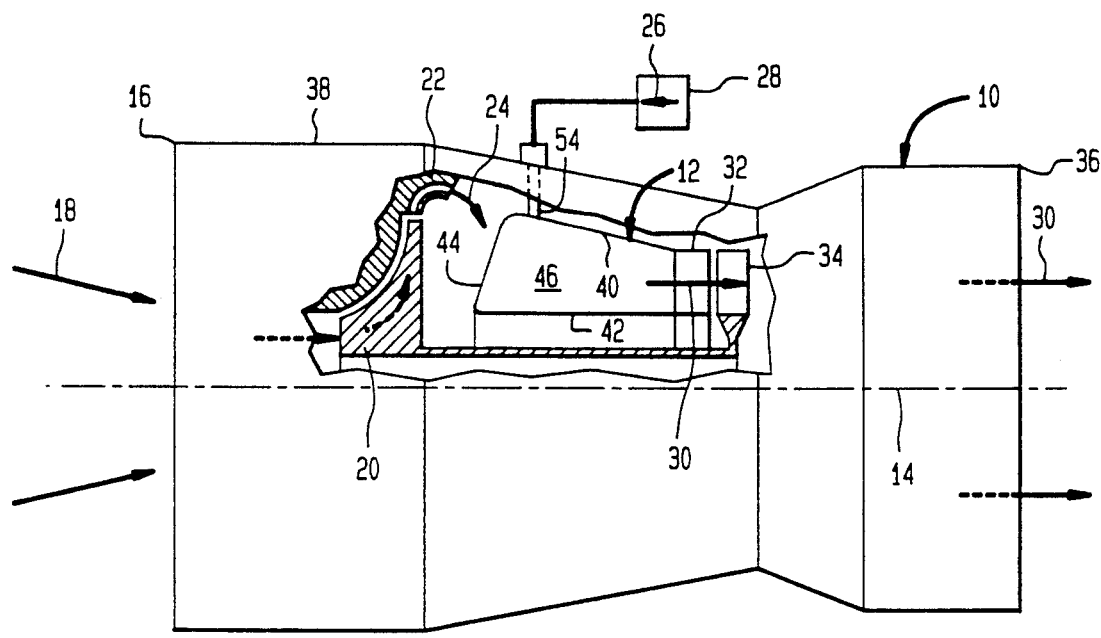
FIG. 1 is an axial schematic view of an exemplary gas turbine engine including a combustor in accordance with one embodiment of the present invention.

Illustrated in FIG. 1 is an exemplary gas turbine engine 10 including an annular combustor 12 having an axial, longitudinal centerline axis 14. The engine 10 also includes an inlet 16 for receiving ambient air 18 which is compressed in a conventional centrifugal compressor 20 which includes a conventional diffuser 22 which discharges compressed air 24 around the combustor 12. Fuel 26 is provided from a conventional fuel supply 28 and channeled to the combustor 12 as further described hereinbelow, mixed with the compressed air 24, and conventionally ignited to generate combustion gases 30 which are discharged from the combustor 12 through a conventional nozzle 32 for flow to a conventional high pressure turbine 34 which is conventionally joined to the compressor 20 for powering the compressor 20 during operation. The combustion gases 30 flow downstream from the turbine 34 through a conventional low pressure turbine (not shown) for conventionally powering an output shaft (not shown), and then are discharged from a conventional outlet 36.

Figure 2:
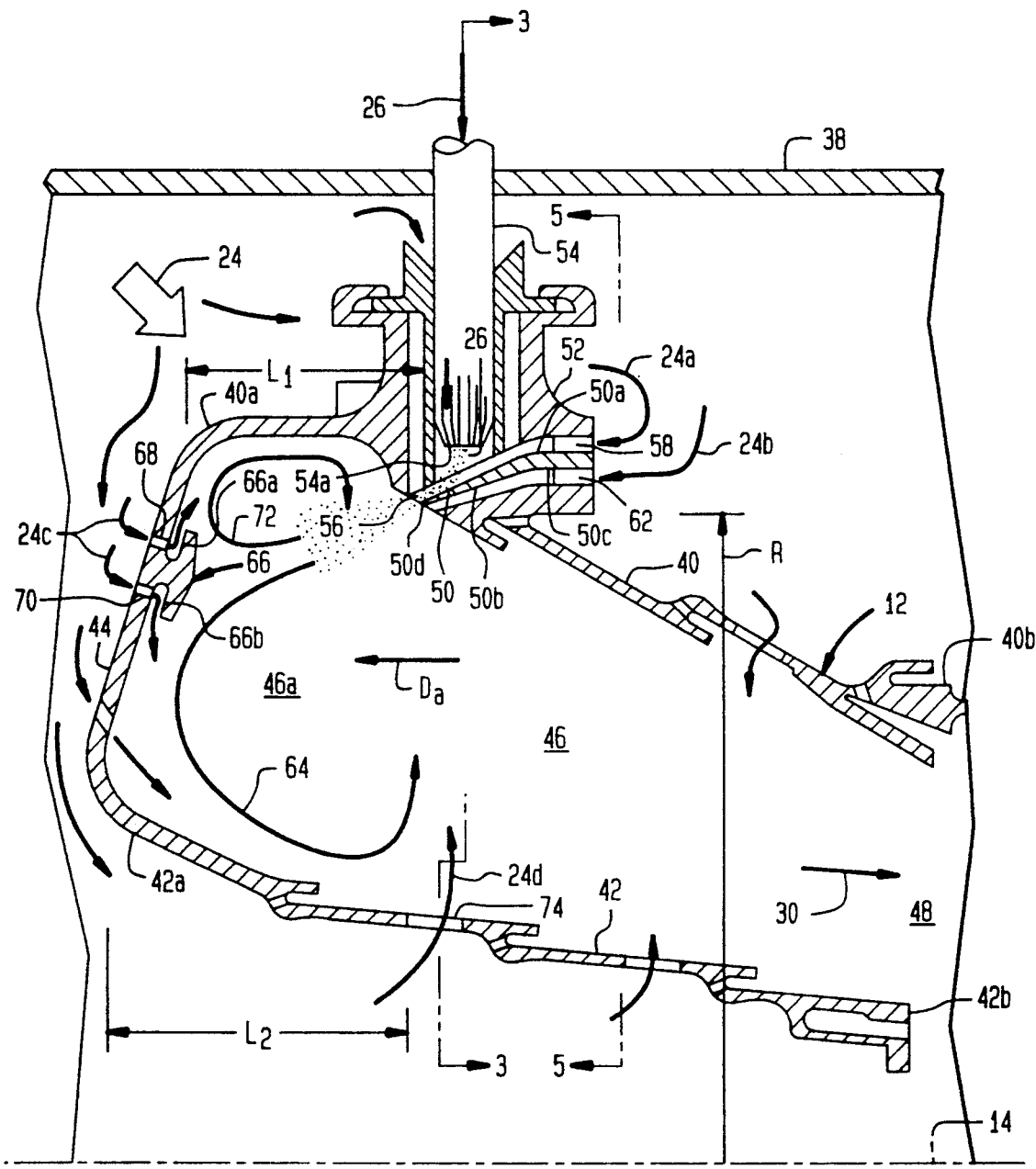
FIG. 2 is an axial sectional view of a top portion of the combustor illustrated in FIG. 1 in accordance with one embodiment of the present invention.

The combustor 12 in accordance with one embodiment of the present invention is shown in more particularity in FIG. 2 and is conventionally disposed radially inwardly of a conventional annular casing 38 which surrounds the engine 10. The combustor 12 includes an annular, radially outer combustion liner 40, disposed coaxially about the centerline axis 14, which includes a forward or upstream end 40a and a downstream or aft end 40b. An annular radially inner combustion liner 42 is disposed coaxially about the centerline axis 14 and is spaced radially inwardly from the outer liner 40, and includes a forward or upstream end 42a and a downstream or aft end 42b.

An annular dome 44 is disposed coaxially about the centerline axis 14 and is conventionally fixedly joined to the outer and inner liner forward ends 40a and 42a. The outer liner 40, the inner liner 42, and the dome 44 define therebetween a combustion zone 46 which extends from the dome 44 axially downstream to the liner aft ends 40b and 42b which define radially therebetween an annular combustor outlet 48 disposed coaxially about the centerline axis 14.

In accordance with the present invention, an arcuate slinger or splashplate 50 is fixedly joined to one of the outer liner 40, the inner liner 42, and the dome 44 and is disposed coaxially about the centerline axis 14 in flow communication with the combustion zone 46. In the embodiment illustrated in FIG. 2, the splashplate 50 is joined to the outer liner 40 and spaced aft from the dome 44 at a predetermined axial distance $L_1$. Also in the embodiment illustrated in FIG. 2, the splashplate 50 is annular, or a full 360° ring disposed radially outwardly from the centerline axis 14 at an inner radius R. The splashplate 50 is preferably fixedly joined to the outer liner 40 by being disposed in an annular housing 52 disposed coaxially about the centerline axis 14 and may be formed integrally therewith as a conventional casting. The splashplate 50 includes first and second opposite, arcuate surfaces 50a and 50b, a leading end 50c and a trailing edge 50d. In the embodiment illustrated in FIG. 2, the splashplate first surface 50a is disposed radially outwardly from the splashplate second surface 50b, with the former being convex and the latter being concave about the centerline axis 14.

Extending radially inwardly into the housing 52 are a plurality of circumferentially spaced apart conventional fuel injectors 54 which may be in the exemplary form of plain jet atomizing fuel injectors. Each of the fuel injectors 54 includes an outlet 54a disposed adjacent to the splashplate 50 for injecting the fuel 26 against the splashplate 50. As illustrated in more particularity in FIG. 3, the fuel injector outlets 54a are preferably inclined tangentially to the splashplate 50 at an acute angle A, of about 30° for example, for injecting the fuel 26 tangentially, also at the acute angle A, against the splashplate first surface 50a in a circumferential direction $D_c$.

Referring again to FIG. 2, means are provided for channeling a portion of the compressed air 24 as primary air 24a along the splashplate 50 for mixing with the injected fuel 26 for forming a fuel/air mixture 56 which is discharged from the splashplate 50 into the combustion zone 46.

Figure 4:
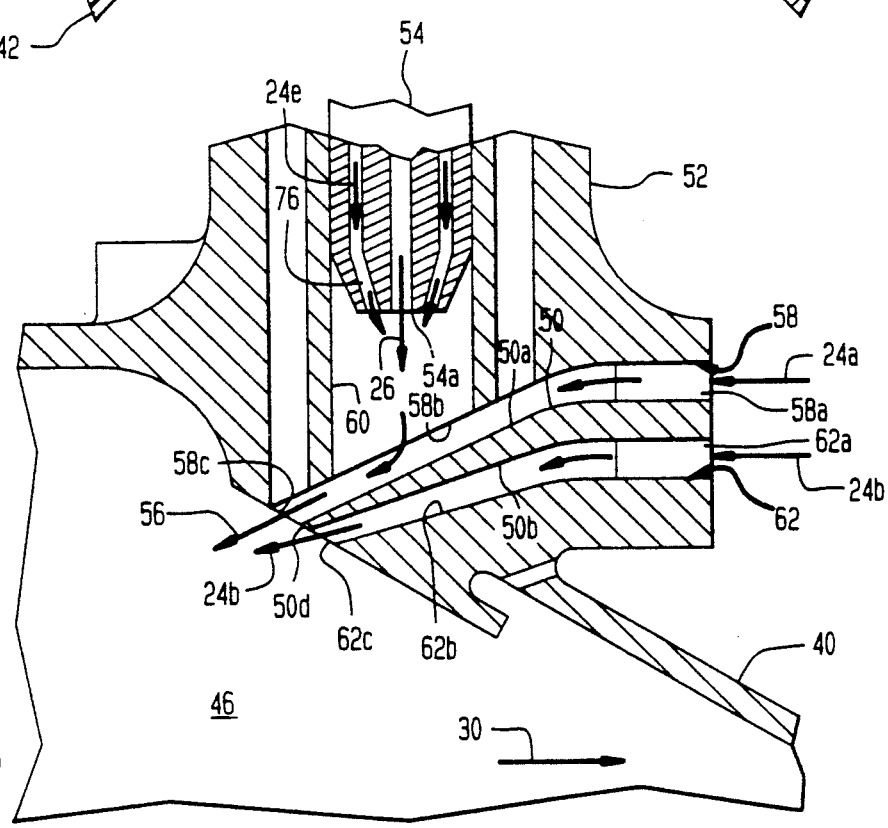
FIG. 4 is an enlarged, axial sectional view of the housing including the splashplate and fuel injector illustrated in FIG. 2.

As illustrated in more particularity in FIG. 4, the air channeling means includes an annular first channel 58 disposed in the housing 52 adjacent to the splashplate first surface 50a and coaxially about the centerline axis 14. The first channel 58 extends axially along the splashplate first surface 50a and includes a first inlet portion 58a for receiving the primary air 24a followed in turn by a first intermediate portion 58b which extends axially forward from, in the upstream direction relative to the flow of the combustion gases 30, the first inlet portion 58a in flow communication therewith for receiving the primary air 24a therefrom. The fuel injections 54 extend through the housing 52 through apertures 60 therein which join to the outer surface of the channel first intermediate portion 58b for being disposed in flow communication therewith. The fuel 26 from the injectors 54 mixes in the first intermediate portion 58b with the primary air 24a for forming the fuel/air mixture 56. The first channel 58 also includes a first outlet 58c disposed in flow communication with the forward end of the first intermediate portion 58b at the splashplate trailing edge 50d for discharging the fuel/air mixture 56 toward the dome 44 in the upstream direction in the combustion zone 46 relative to the combustion gases 30 which flow generally downstream therein.

Figure 3:
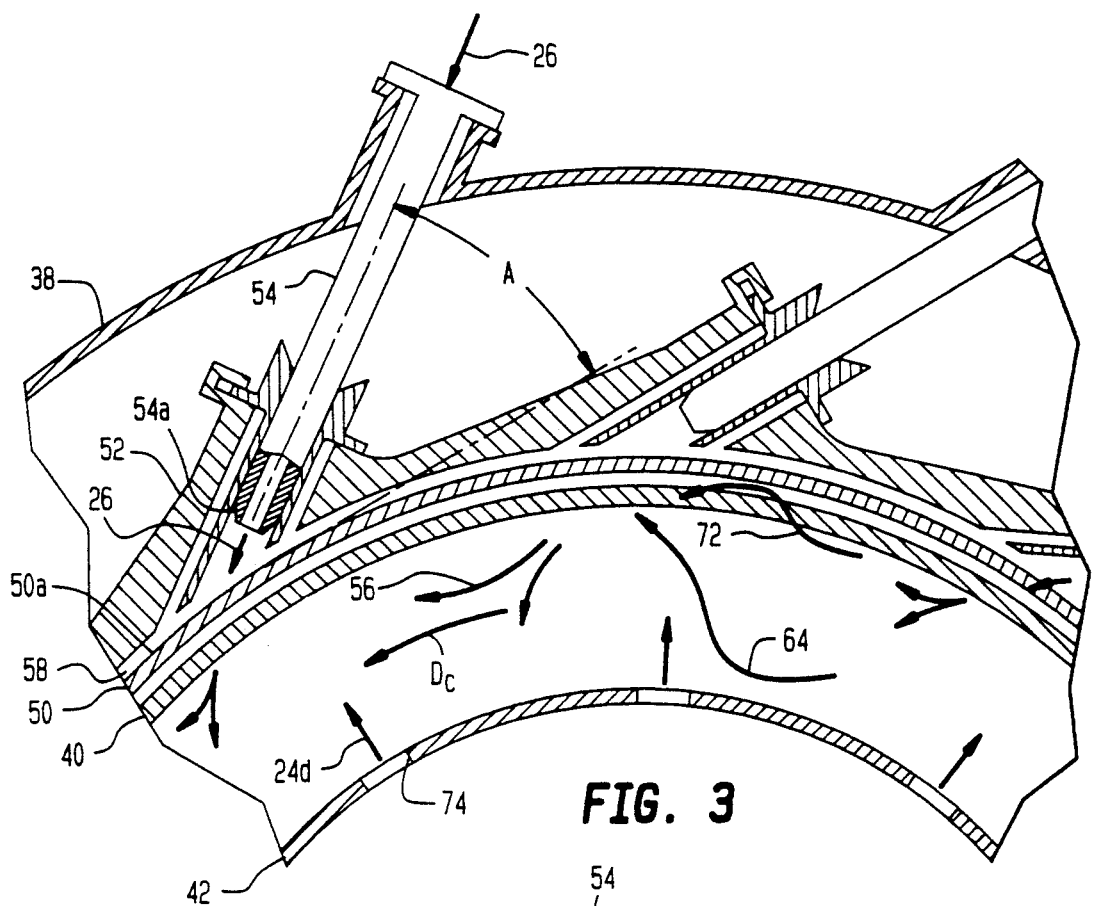
FIG. 3 is an aft facing, radial sectional view of a portion of the combustor illustrated in FIG. 2 taken along line 3—3.

As shown in FIG. 2, the combustion zone 46 includes a primary zone 46a extending from the dome 44 downstream to about the axial plane of the fuel injectors 54 and splashplate 50. Since the splashplate 50 extends generally axially, with the first channel 58 extending in a generally upstream direction with the channel first outlet 58c facing upstream toward the dome 44, the primary air 24a channeled through the first channel 58 will mix with the fuel 26 injected into the channel first intermediate portion 58b against the splashplate first surface 50a and purge the fuel 26 from the first channel 58 toward the dome 44 in the primary zone 46a. Since the fuel 26 is injected against the splashplate first surface 50a at the angle A as illustrated in FIG. 3, the resulting fuel/air mixture 56 will experience velocity components both in the circumferential direction $D_c$ and in an upstream axial direction $D_a$, as shown in FIG. 2, toward the dome 44. Accordingly, the splashplate 50 will sling the fuel/air mixture 56 in the circumferential direction $D_c$ for forming a substantially annular sheet of atomized fuel, i.e. fuel/air mixture 56 into the primary zone 46a. In this way, a more uniform circumferential distribution of the fuel/air mixture 56 may be obtained with a resulting reduction in pattern factor of the combustion gases 30 discharged from the outlet 48 of the combustor 12.

Figure 5:
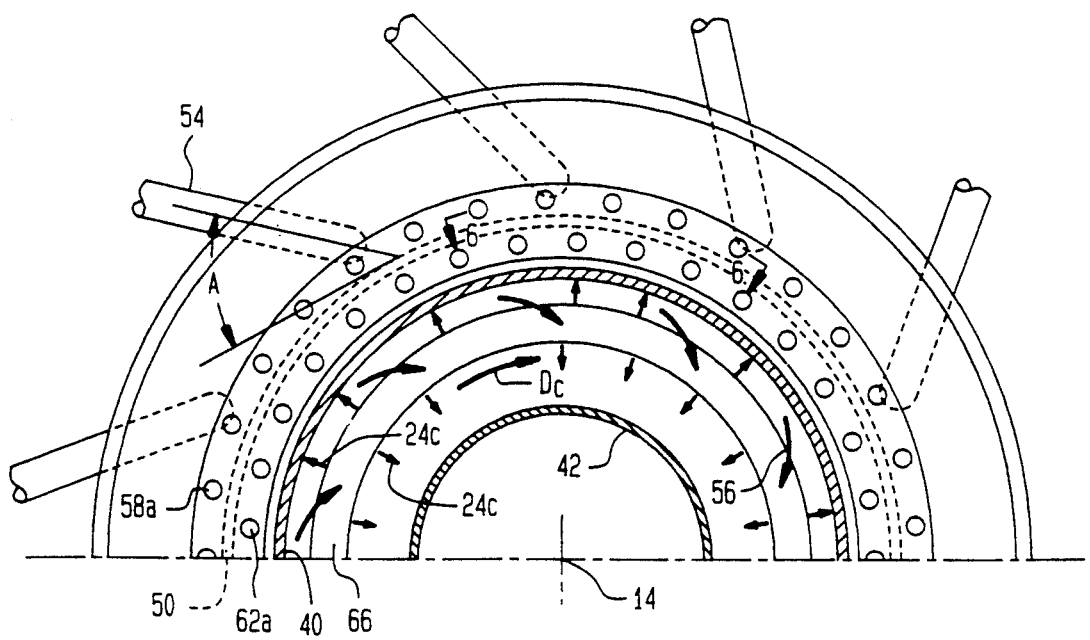
FIG. 5 is a forward facing, partly sectional, radial view of a portion of the combustor illustrated in FIG. 2 taken along line 5—5.
Figure 6:
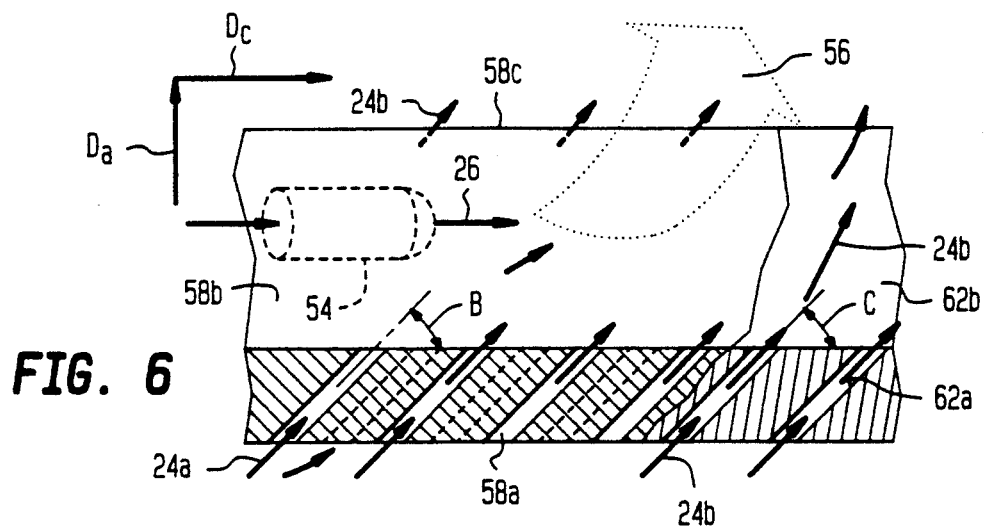
FIG. 6 is a partly sectional view of a portion of the combustor illustrated in FIG. 5 taken along circumferential line 6—6.

The degree of circumferential uniformity of the fuel/air mixture 56 discharged from the annular first outlet 58c is directly related to the number of fuel injectors 54 disposed around the circumference of the combustor 12 and the velocity of the primary air 24a channeled through the first channel 58. It is also related to the inclination or impingement angle A of the fuel 26 from the injector outlets 54a against the splashplate first surface 50a. Referring to FIGS. 5 and 6, the fuel injectors 54 are shown aligned in a single axial plane for injecting the fuel 26 at the acute angle A. However, the fuel injectors 54 could also be inclined in the axial direction as well as the circumferential direction for discharging the fuel 26 with both a circumferential component of velocity ($D_c$) as well as an axial component of velocity in the upstream direction ($D_a$) if desired. In order to improve the circumferential spreading or slinging of the fuel/air mixture 56 in the circumferential direction $D_c$, the channel first inlet portion 58a is in the exemplary form of a plurality of circumferentially spaced apart first apertures, also designated 58a, each inclined circumferentially at an acute angle B measured in the upstream direction toward the dome 44 from the circumferential direction $D_c$ for discharging the primary air 24a into the channel first intermediate portion 58b with a component of velocity in the circumferential direction $D_c$, and, preferably with a velocity component in the upstream axial direction $D_a$ as well. The velocity components of the fuel 26 and the primary air 24a are preferably co-rotational in the same circumferential direction $D_c$ for increasing the circumferential slinging of the fuel/air mixture 56 from the first outlet 58c into the primary zone 46a.

In order to additionally control or increase the circumferential spreading of the fuel/air mixture discharged from the first outlet 58c, the housing 52 further includes an annular second channel 62 as illustrated in FIGS. 4 and 6. The second channel 62 is disposed adjacent to the splashplate second, or flameside, surface 50b and coaxially about the centerline axis 14. The second channel 62 includes a second inlet portion 62a, also preferably in the form of a plurality of circumferentially spaced apart second apertures, for receiving a portion of the compressed air 24 as secondary air 24b. A second intermediate portion 62b extends axially from the second inlet portion 62a along the splashplate 50 toward the trailing edge 50d in flow communication with the second inlet portion 62a for receiving the secondary air 24b therefrom. A second outlet 62c is disposed in flow communication with the second intermediate portion 62b at the splashplate trailing edge 50d for discharging the secondary air 24b adjacent to the fuel/air mixture 56 discharged from the first outlet 58c. The secondary air 24b thusly cools the flameside of the splashplate 50, i.e. the splashplate second surface 50b, and assists in further atomizing the fuel 26 contained in the fuel/air mixture 56. In the preferred embodiment of the present invention, the second inlet portion apertures 62a as shown in FIG. 6 are also preferably inclined in the circumferential direction at an acute angle C which may be equal to the acute angle B, for example, for discharging the secondary air 24b into the second intermediate portion 62b with a component of velocity in the circumferential direction $D_c$, and, preferably with a velocity component in the upstream axial direction $D_a$. The secondary air 24b is thusly caused to swirl in the circumferential direction $D_c$ and upon discharge from the second outlet 62c promotes the circumferential spreading of the fuel/air mixture 56 as well as further atomizes the fuel 26 therein.

In the exemplary embodiment of the invention illustrated in FIG. 2, 4 and 6 wherein the splashplate 50 is joined to the outer liner 40 downstream from the dome 44, the first and second inlet portions 58a and 62a face toward the outer liner aft end 40b, and the first and second outlets 58c and 62c and the splashplate trailing edge 50d face toward the dome 44 for channeling the primary air 24a and the secondary air 24b through the outer liner 40 axially upstream toward the dome 44 in the axial direction $D_a$ as well as in the circumferential direction $D_c$. In this way, an annular or toroidal main vortex 64 is formed coaxially about the centerline axis 14 in the primary zone 46a. Since the fuel/air mixture 56 is injected into the primary zone 46a from the first outlet 58c which is a 360° annular slot, and is directed radially inwardly toward the dome 44, and since the inner liner 42 extends axially downstream from the dome 44, a toroid or toroidal vortex recirculation is formed which spins counterclockwise in its top half as illustrated in FIG. 2. Since the fuel/air mixture 56 also includes a circumferential component of velocity as shown in FIG. 6, the main vortex 64 also circulates circumferentially around the centerline axis 14. The main vortex 64 is formed of the fuel/air mixture 56 which may be conventionally ignited by a conventional igniter extending through the outer liner 40 between the dome 44 and the housing 52 (not shown) with the fuel/air mixture thereby undergoing combustion which recirculates in the form of the main vortex 64 before being channeled downstream through the combustor 12 as the combustion gases 30 which are discharged from the outlet 48.

As shown in FIG. 2, the dome 44 preferably includes an annular film-cooling nugget 66 disposed coaxially about the centerline axis 14. The nugget 66 includes a radially outwardly facing circumferential outer slot 66a disposed in flow communication with a plurality of circumferentially spaced apart apertures 68 through the dome 44. The nugget 66 also includes a radially inwardly facing circumferential inner slot 66b disposed in flow communication with a plurality of circumferentially spaced apart apertures 70. The apertures 68 and 70 receive a portion of the compressed air 24 as film-cooling air 24c which is channeled into the respective outer and inner slots 66a and 66b for discharging the film-cooling air 24c radially outwardly and inwardly, respectively, along the dome 44 for the cooling thereof. The outer and inner liners 40 and 42 and the dome 44 include additional conventional film-cooling nuggets, as is conventionally known, which may be suitably angled to augment the vortex recirculation both radially and circumferentially if desired.

However, in accordance with the present invention, the double flow nugget 66 is provided in the dome 44 radially between the outer liner 40 and the inner liner 42 in alignment with the fuel/air mixture 56 discharged from the splashplate trailing edge 50d so that the channel first and second outlets 58c and 62c face the nugget 66 for discharging the fuel/air mixture and the secondary air 24b toward the nugget 66. In this way, the main vortex 64 is formed in the primary zone 46a radially below the nugget 66, and a toroidal, pilot recirculation vortex 72 may be formed radially above the nugget 66 from a portion of the fuel/air mixture 56. As shown in FIG. 2, the pilot vortex 72 rotates in a clockwise direction for the upper half of the combustor 12 illustrated. The film-cooling air 24c discharged radially outwardly from the nugget outer slot 66a enhances the clockwise circulation of the pilot vortex 72, while the film-cooling air 24c discharged radially inwardly from the nugget inner slot 66b enhances the counterclockwise recirculation of the main vortex 64. In this way, the flame stability of the burning fuel/air mixture 56 may be improved by the pilot vortex 72 which may be selected for providing a relatively rich fuel/air mixture 56 at low power operation of the combustor 12. At low power operation, the velocity of the compressed air 24 is relatively low so that the fuel 26 discharged against the splashplate 50 will enter the primary zone 46a with relatively low momentum which will therefore foom a relatively rich pilot vortex 72. As power of the combustor 12 increases during operation, the velocity of the compressed air 24 increases with a corresponding increase in momentum of the fuel/air mixture 56 discharged from the splashplate trailing edge 50d with a majority of the fuel 26 therein then being carried into the main vortex 64.

In order to further enhance the main vortex 64, the inner liner 42 as illustrated in FIG. 2 includes a row of unopposed (in the outer liner 40) circumferentially spaced apart dilution holes 74 disposed generally radially below the fuel injectors 54 and generally aligned axially with the first and second outlets 58c and 62c (see FIG. 4) and spaced aft of the dome 44 an axial distance $L_2$ for channeling radially outwardly into the combustion zone 46 another portion of the compressed air 24 as dilution air 24d for enhancing axial recirculation of the main vortex 64 of the fuel/air mixture 56 and the secondary air 24b.

Accordingly, the combustor 12 is effective for eliminating the injection of a plurality of fuel/air mixtures at discrete circumferentially spaced apart locations as found in conventional combustors, while providing the annular splashplate 50 which allows the fuel injectors 54 to provide a more uniform annular sheet of atomized fuel as the fuel/air mixture 56 discharged from along the splashplate trailing edge 50d. The improved circumferential uniformity of the fuel/air mixture 56 will improve the pattern factor, or circumferential uniformity of the temperature of the combustion gases 30 discharged from the combustor outlet 48. Furthermore, a single toroidal main vortex 64 and a single toroidal pilot vortex 72 are provided instead of the plurality of vortices associated with the respective plurality of circumferentially spaced apart carburetors in a conventional combustor, while providing flame stability at low power. The pilot vortex 72 is preferably rich at low power for good flame stability, while the main vortex 64 may be lean at higher power operation of reducing exhaust emissions. Yet further, by locating the injectors 54 and the housing 52 in the outer liner 40 downstream of the dome 44, a more compact and shorter combustor 12 having reduced weight by be obtained.

Yet further, a relatively simple fuel atomizer in the form of the fuel injectors 54 injecting fuel against the single splashplate 50 by be obtained. The fuel injectors 54 be relatively simple in construction being a low pressure fuel design discharging a plain jet of the fuel 26 from the outlet 54a. In other embodiments of the invention, conventional high pressure fuel injectors 54 could be also be utilized. And, as shown in more particularity in FIG. 4, the fuel injector 54 may include a coaxial annular passage 76 therein surrounding the outlet 54a for channeling another portion of the compressed air 24 as injector air 24e around the fuel 26 for atomizing and directing the fuel 26 as well as for providing additional mixing of the fuel 26 with the injector air 24e prior to impinging against the splashplate 50.

The velocity of the primary and secondary air 24a and 24b channeled through the first and second channels 58 and 62, respectively, and the inclination angles B and of the inlet apertures 58a and 62a may be selected as desired for controlling the amount of circumferential spreading of the fuel/air mixture 56 as well as for controlling the main vortex 64 and the pilot vortex 72 during operation of the combustor 12.

Figure 7:
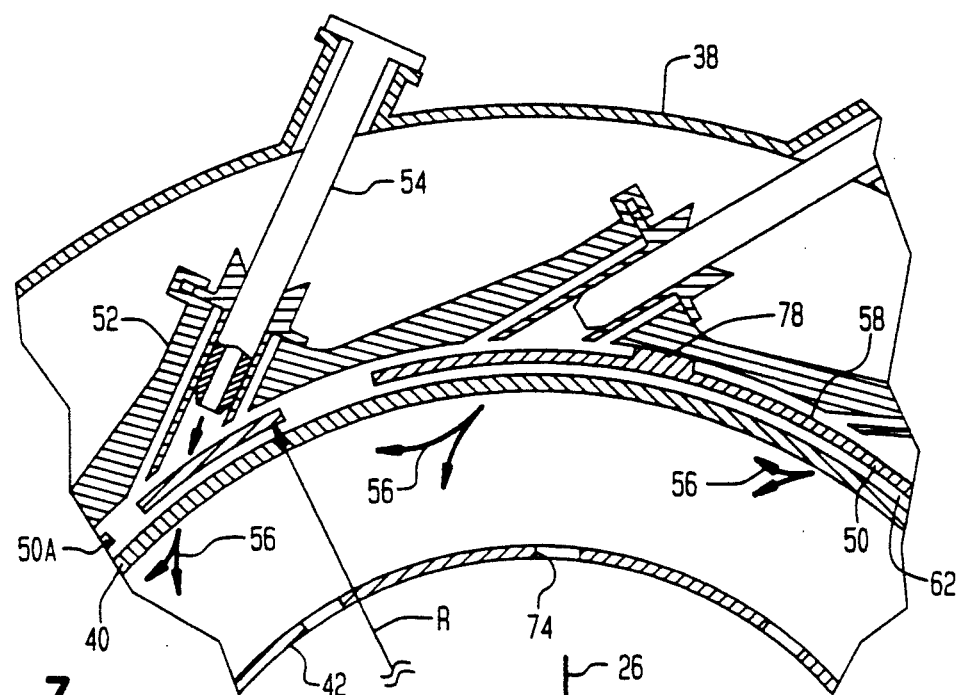
FIG. 7 is an aft facing, radial sectional view of a portion of the combustor illustrated in FIG. 2 which is identical to FIG. 3 except for two alternate embodiments of the splashplate in accordance with the present invention.

Although it is generally desirable in accordance with the present invention to increase the circumferential spreading of the fuel/air mixture by the splashplate 50, the longer the fuel/air mixture 56 flows along the splashplate first surface 50a the more likely that the fuel 26 may form undesirable carbon deposits on the splashplate 50. Accordingly, in accordance with additional embodiments of the invention as illustrated in FIG. 7, a plurality of circumferentially spaced apart partitions 78 extending radially outwardly from the splashplate 50 are provided to prevent circumferential flow past the partitions 78 in the first channel 58. In this way, the circumferential travel of the fuel/air mixture 56 within the bifurcated first channel 58 is limited by impingement against the partition 78.

FIG. 7 also discloses an alternate embodiment of the splashplate 50 which may be in the form of a plurality of circumferentially spaced apart arcuate segments, designated 50A which are disposed coaxially about the centerline axis 16 at a common radius R therefrom. The spacing between the circumferentially adjacent segments 50A may be selected to ensure that the fuel/air mixture flows circumferentially along each segment 50A for a relatively short time to avoid undesirable buildup of carbon thereon.

Figure 8:
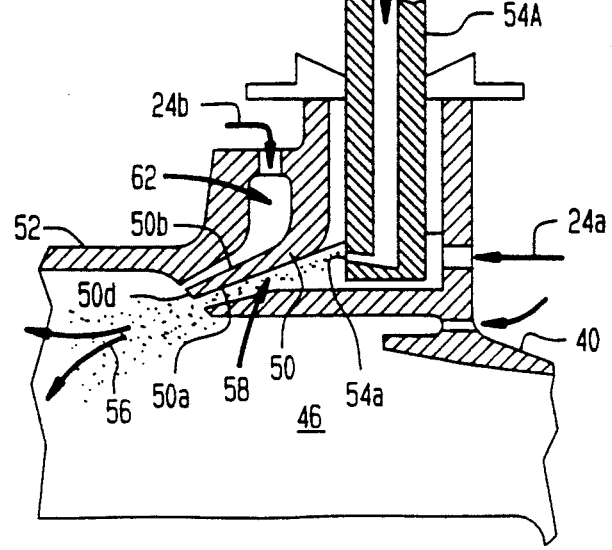
FIG. 8 is an axial sectional view of a portion of the outer liner illustrated in FIG. 2 illustrating a splashplate and fuel injector in accordance with another embodiment of the present invention.

In the embodiment illustrated in FIG. 4, the fuel 26 is injected radially inwardly against the splashplate first surface 50a, with the flameside of the splashplate 50, i.e. splashplate second surface 50b, being cooled by the secondary air 24b. In the alternate embodiment of the invention illustrated in FIG. 8, the splashplate first surface 50a is instead disposed radially inwardly from the splashplate second surface 50b and is concave about the centerline axis 14. A suitable fuel injector 54A may be conventionally provided in the housing 52 for discharging the fuel 26 radially upwardly toward the splashplate first surface 50a. Correspondingly, the first channel 58 is disposed radially inwardly of the splashplate 50 with the second channel 62 being disposed radially outwardly thereof. Since the splashplate first surface 50a is concave, and the fuel 26 and the primary air 24a flow therealong, the centrifugal forces acting thereon will improve the circumferential spreading thereof.

Figure 9:
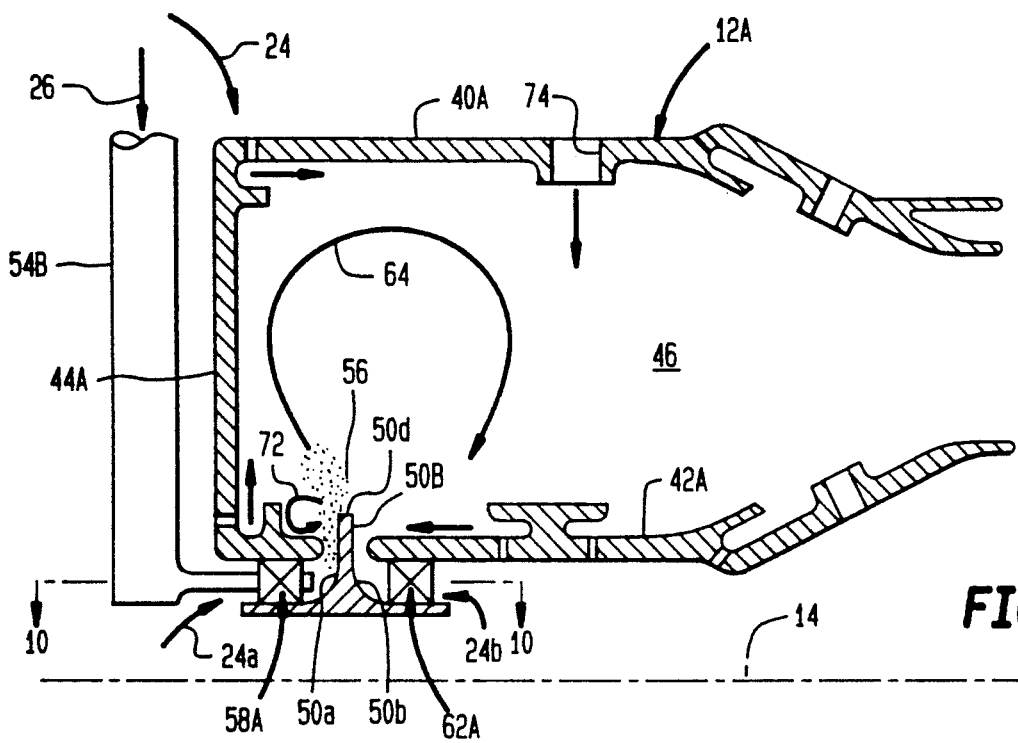
FIG. 9 is a schematic, axial sectional view of a combustor in accordance with another embodiment of the present invention.
Figure 10:
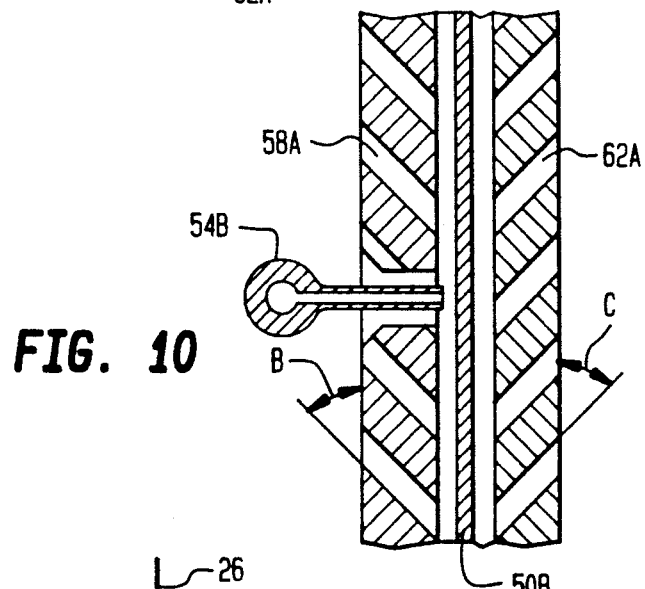
FIG. 10 is a sectional view of a portion of the combustor illustrated in FIG. 9 taken along line 10—10.

Illustrated schematically in FIGS. 9 and 10 is another embodiment of the combustor designated 12A wherein the splashplate designated 50B is joined to an inner liner 42A at its forward end and extends radially outwardly. The first and second channels designated 58A and 62A are disposed axially oppositely apart toward the splashplate first and second surfaces 50a and 50b, with the first and second inlet apertures 58A and 62A being inclined circumferentially oppositely to each other. The fuel injector designated 54B provides the fuel 26 through the first channel 58A in impingement against the splashplate first surface 50a. The first row of the dilution holes 74 is disposed in this embodiment in the outer liner 40A axially downstream from the splashplate 50B to similarly enhance the main toroidal vortex 64 which in this embodiment of the invention flows in a clockwise direction in the upper half of the combustor 12A. The splashplate trailing edge 50d preferably projects into the combustion zone 46 for cooperating with the dome 44A to provide the pilot vortex 72 and flame holding or stability.

Figure 11:
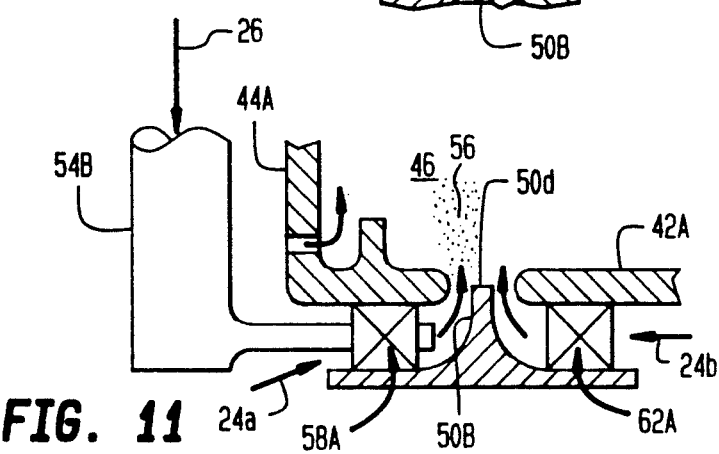
FIG. 11 is an axial sectional view of a portion of the combustor illustrated in FIG. 9 illustrating a splashplate in accordance with another embodiment of the present invention.

As illustrated in FIG. 11, the splashplate trailing edge 50d may be recessed away from the combustion zone 46 to allow the secondary air 24b to more fully mix with the fuel/air mixture 56 before discharge into the combustion zone 46, as well as for ensuring that the splashplate 50B remains relatively cool preventing carbon buildup thereon.

As shown in FIG. 4, the splashplate trailing edge 50d may be aligned with the inner surface of the outer liner 40.

Figure 12:
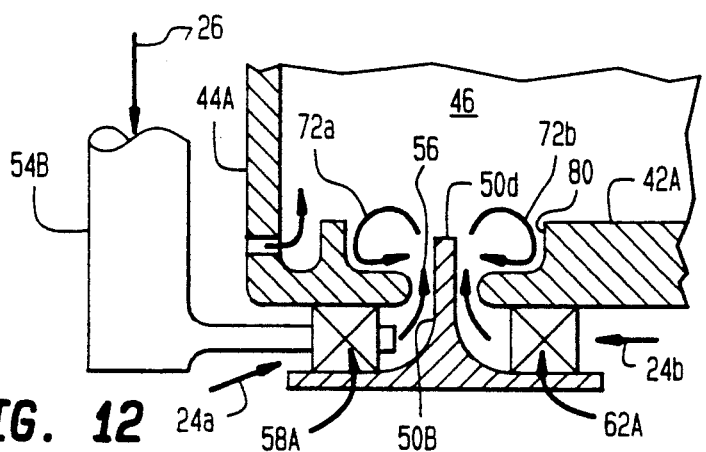
FIG. 12 is a axial sectional view of a portion of the combustor illustrated in FIG. 9 illustrating the splashplate and inner liner in accordance with another embodiment of the present invention.

As shown in FIG. 12, the inner liner 42A may include an annular recess 80 into which the splashplate trailing edge 50d extends. In this way, the fuel/air mixture 56 discharged from the first channel 58A may form two toroidal pilot vortexes 72a and 72b on both sides of the splashplate 50B for enhanced flame stability during low power operation of the combustor.

Figure 13:
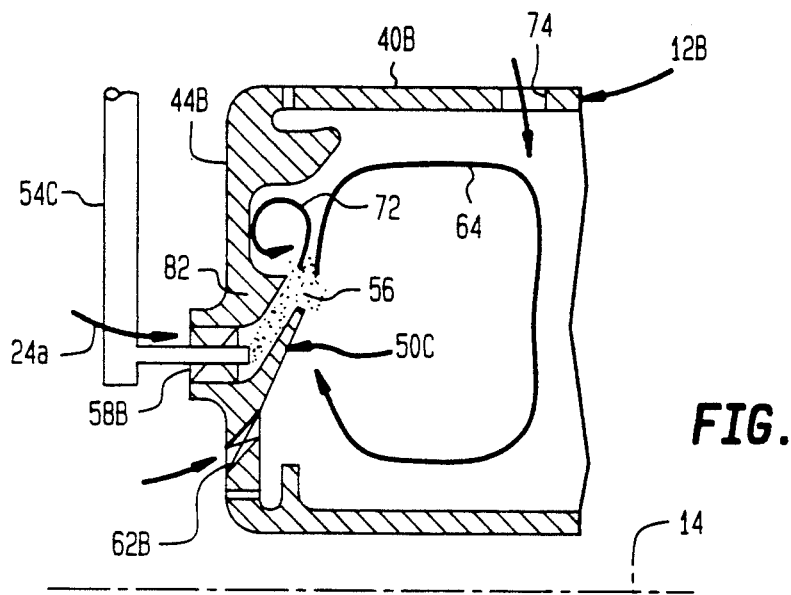
FIG. 13 is a schematic, axial sectional view of an upstream end of a combustor in accordance with another embodiment of the present invention.

FIG. 13 illustrates yet another embodiment of the combustor designated 12B wherein the splashplate designated 50C is joined to a radially center region of a dome 44B and is inclined radially and axially toward the outer liner 40B. The first channel 58B and the fuel injectors 54C are disposed on the radially outer side of the splashplate 50C with the second channel 62B being disposed on the radially inner side of the splashplate 50C. The first row of dilution holes 74 are disposed in the outer liner 40B downstream of the dome 44B to enhance the formation of the main toroidal vortex 64 which flows in a clockwise direction in the upper half of the combustor 12B as shown in FIG. 13. The dome 44B includes an axial projection 82 which defines a portion of the first channel 58B, which allows the pilot vortex 72 to form behind it.

Figure 14:
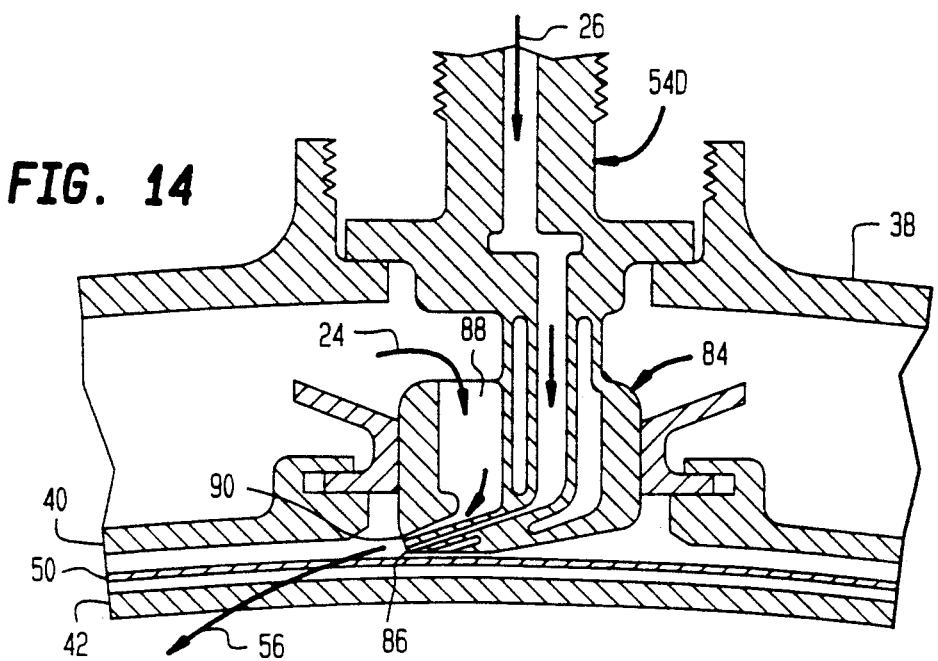
FIG. 14 is a schematic, radial sectional view of a fuel injector and air swirling means for the combustor illustrated in FIG. 2 in accordance with another embodiment of the present invention.

Illustrated in FIG. 14 is another embodiment of the fuel injectors designated 54D which includes an outlet body 84 having a tangentially inclined fuel outlet 86 for impinging the fuel 26 against the splashplate 50. A majority portion of the fuel injector 54D may extend directly radially outwardly from the outer liner 40 with only the fuel outlet 86 being inclined. The outlet body 84 includes a concentric channel 88 surrounding the fuel outlet 86 for channeling a portion of the compressed air 24 around the fuel outlet 86. The channel 88 includes an annular outlet 90 which discharges the compressed air 24 around the fuel 26 discharged from the fuel outlet 86 for mixing therewith for generating the fuel/air mixture 56.

Accordingly, in view of the several embodiments of the invention disclosed above, it will be apparent to those skilled in the art that various forms of the arcuate splashplate 50 may be utilized in either the combustor outer liner 40, inner liner 42, or dome 44 for injecting the fuel/air mixture 56 along a common radius into the combustion zone 46 as an annular sheet of fuel and air for improving circumferential uniformity of the fuel/air mixture 56, and therefore, improving the pattern factor of the combustion gases discharged from the combustor outlet 48.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

I claim:

1. A gas turbine engine combustor having a longitudinal centerline axis comprising:
    an annular outer liner disposed coaxially about said centerline axis and having forward and aft ends;
    an annular inner liner disposed coaxially about said centerline axis and spaced radially inwardly from said outer liner, and having forward and aft ends;
    an annular dome fixedly joined to said outer and inner liner forward ends for defining with said outer and inner liners an annular combustion zone therebetween;
    an arcuate splashplate joined to one of said outer liner, inner liner and dome, and disposed coaxially about said centerline axis in flow communication with said combustion zone, said splashplate being disposed in a housing and including a trailing edge, and first and second opposite arcuate surfaces disposed coaxially about said centerline axis;
    a plurality of circumferentially spaced apart fuel injectors disposed adjacent to said splashplate for injecting fuel against said splashplate, each of said fuel injectors including an outlet inclined tangentially to said splashplate for injecting said fuel tangentially against said splashplate in a circumferential direction;
    means for channeling primary air along said splashplate for mixing with said injected fuel for forming a fuel/air mixture dischargeable from said splashplate into said combustion zone;
    said air channeling means including an annular first channel in said housing disposed adjacent to said splashplate first surface and coaxially about said centerline axis; and
    said first channel having a first inlet portion for receiving said primary air, a first intermediate portion extending axially from said first inlet portion in flow communication therewith for receiving said primary air therefrom, and disposed in flow communication with said fuel injectors for receiving said fuel therefrom for mixing therein for forming said fuel/air mixture, and a first outlet disposed in flow communication with said first intermediate portion at said splashplate trailing edge for discharging said fuel/air mixture into said combustion zone.

2. A combustor according to claim 1 wherein said first inlet portion is in the form of a plurality of circumferentially spaced apart first apertures inclined for discharging said primary air into said first intermediate portion in said circumferential direction.

3. A combustor according to claim 2 wherein said housing includes an annular second channel disposed adjacent to said splashplate second surface and coaxially about said centerline axis and including:
    a second inlet portion for receiving secondary air;
    a second intermediate portion extending axially from said second inlet portion in flow communication therewith for receiving said secondary air therefrom; and
    a second outlet disposed in flow communication with said second intermediate portion at said splashplate trailing edge for discharging said secondary air adjacent to said fuel/air mixture discharged from said first outlet.

4. A combustor according to claim 3 wherein said second inlet portion includes a plurality of circumferentially spaced apart second apertures inclined for discharging said secondary air into said second intermediate portion in said circumferential direction.

5. A combustor according to claim 4 wherein:
said splashplate is joined to said outer liner and spaced in an aft direction from said dome;
said splashplate first surface is disposed radially outwardly from said splashplate second surface and is convex about said centerline axis;
said first and second inlet portions face in said aft direction away from said dome, and said first and second outlets and said splashplate trailing edge face said dome for channeling said primary and secondary air through said outer liner axially toward said dome and in said circumferential direction.

6. A combustor according to claim 5 wherein;
said dome includes an annular film-cooling member disposed coaxially about said centerline axis, said film-cooling member having a radially outwardly facing circumferential outer slot for discharging film-cooling air radially outwardly along said dome, and a radially inwardly facing circumferential inner slot for discharging film-cooling air radially inwardly along said dome; and
said first and second channel outlets face said film-cooling member for discharging said fuel/air mixture and said secondary air toward said film-cooling member.

7. A combustor according to claim 6 wherein:
said inner liner includes a row of circumferentially spaced apart dilution holes axially aligned with said first and second outlets and spaced aft of said dome for channeling radially outwardly into said combustion zone dilution air for axial vortex recirculation of said fuel/air mixture.

8. A combustor according to claim 7 wherein said splashplate is annular.

9. A combustor according to claim 8 further including a plurality of circumferentially spaced apart partitions extending radially from said splashplate to prevent circumferential flow therepast in said first channel.

10. A combustor according to claim 4 wherein said splashplate includes a plurality of circumferentially spaced apart arcuate segments disposed coaxially about said centerline axis at a common radius.

11. A combustor according to claim 4 wherein said splashplate first surface is disposed radially inwardly from said splashplate second surface and is concave about said centerline axis.

12. A combustor according to claim 4 wherein said splashplate trailing edge projects into said combustion zone.

13. A combustor according to claim 4 wherein said splashplate trailing edge is recessed away from said combustion zone.

14. A combustor according to claim 4 wherein:
said splashplate is joined to said inner liner forward end and extends radially outwardly; and
said first and second channels are disposed axially oppositely apart toward said splashplate first and second surfaces, said first and second apertures being inclined circumferentially oppositely to each other.

15. A combustor according to claim 4 wherein said splashplate is joined to a center region of said dome and is inclined radially and axially toward said outer liner.

* * * * *